United States Patent [19]
Davella

[11] 3,820,682
[45] June 28, 1974

[54] COVERING ARRANGEMENT FOR OPENINGS AND OPTICAL LENSES

[76] Inventor: Nicholas J. Davella, 2 Given Ct., Hauppauge, N.Y. 11787

[22] Filed: May 3, 1972

[21] Appl. No.: 249,907

[52] U.S. Cl............... 220/55 K, 138/89, 217/78, 220/24 B, 220/24.5, 220/55 W, 220/55 Y, 350/65
[51] Int. Cl.......................................... B65d 45/28
[58] Field of Search..... 220/24.5, 24 B, 55 R, 55 G, 220/55 H, 55 Y, 55 K, 55 W, 24.2, 25, 82 A; 217/76, 78, 108; 350/65; 138/89, 93 R

[56] References Cited
UNITED STATES PATENTS
| | | | |
|---|---|---|---|
| 1,193,116 | 8/1916 | Brusseau | 220/24 B |
| 2,226,233 | 12/1940 | Shapiro | 220/24.2 |
| 2,238,379 | 4/1941 | Tiffany | 220/556 |
| 2,522,897 | 9/1950 | Rotter | 350/65 |
| 2,763,293 | 9/1956 | Kruck | 138/89 |
| 3,194,364 | 7/1965 | Kolm | 220/82 A |
| 3,543,801 | 12/1970 | Thayer | 220/24.5 |

Primary Examiner—William I. Price
Assistant Examiner—Stephen Marcus
Attorney, Agent, or Firm—Joseph F. Padlon

[57] ABSTRACT

An arrangement for protecting and covering circular openings and lenses of optical devices. A padded circular disc is provided with a rotatable shaft through its center. A triangular-shaped cam is mounted on the shaft and rotatable therewith. Three arms pivoted at the three vertices of the cam move to-and-from the outer diameter of the disc upon rotation of the shaft.

6 Claims, 2 Drawing Figures

PATENTED JUN 28 1974　　　　　　　　　　　　　3,820,682

COVERING ARRANGEMENT FOR OPENINGS AND OPTICAL LENSES

BACKGROUND OF THE INVENTION

In the manufacture of optical devices such as telescopes, oscilloscopes, cameras and projectors, for example, it is desirable to protect the front or objective lens from possible damage or dust collection when the devices are not in use. Thus, when allowing the front or objective lens to be exposed when the optical device is not being used, the lens may become scratched, chipped, or even fractured as a result of unintentional actions that might occur in the immediate surroundings of the device. Dust may also collect on the exterior surface of the optical lenses, and such dust, after having accummulated for some time, may interfere with the use for which the optical devices are intended.

Whereas lens covers have been known in the art, such covers are designed and manufactured to be adaptable to only a specific device having predetermined dimensions, such as a predetermined diameter of the lens. Such covers in the past, coud not be adapted to covering optical lenses of different diameters, and could not be interchanged with different optical devices.

SUMMARY OF THE INVENTION

It is an object of the present invention to provide an arrangement for covering openings and lenses of optical devices of variable diameter.

It is another object of the present invention to provide an arrangement of the foregoing character which may be applied by the user without requiring special skills or knowledge.

A further object of the present invention is to provide an arrangement, as set forth, which may be economically fabricated and simply maintained.

The objects of the present invention are achieved by providing an arrangement in which a circular disc holds a rotatable shaft at its center. Mounted on this shaft, is a triangular-shaped plate cam which is rotatable with the shaft. Pivotally linked to the three vertices of the cam, are three elongated arms which move to and from the periphery of the disc upon rotation of the shaft by the user. Through rotation of this shaft, a large range of diameters of openings, may be accommodated.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
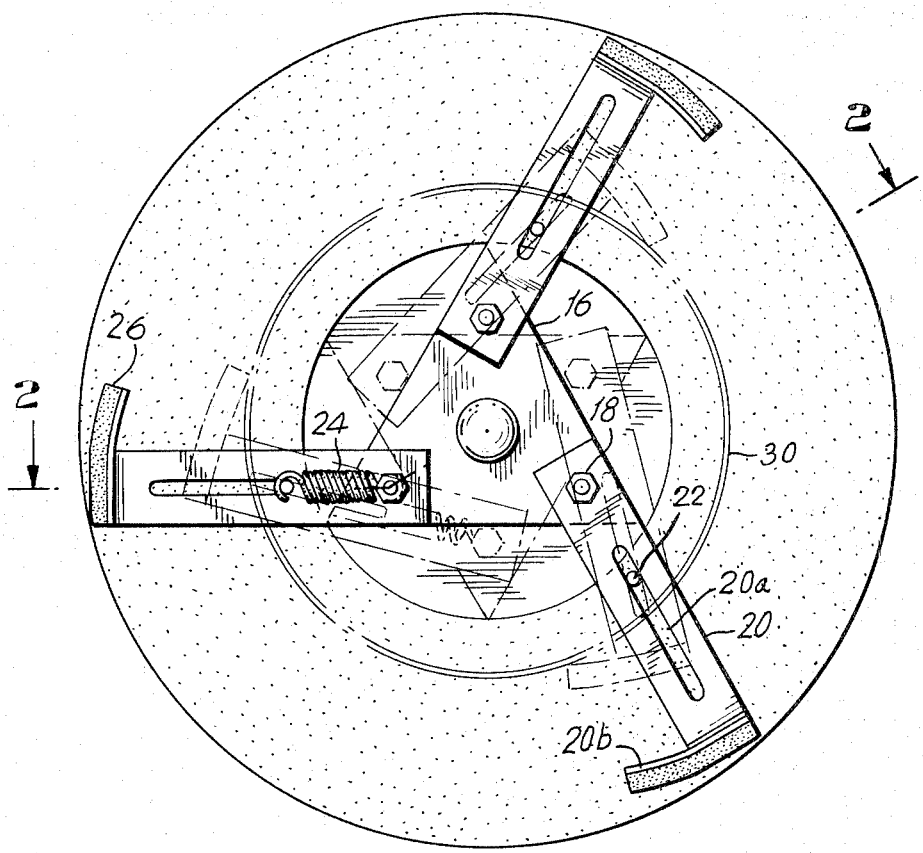
FIG. 1 is a top view and shows the mechanism through which openings of variable diameter may be covered by means of the arrangement in accordance with the present invention.
Figure 2:
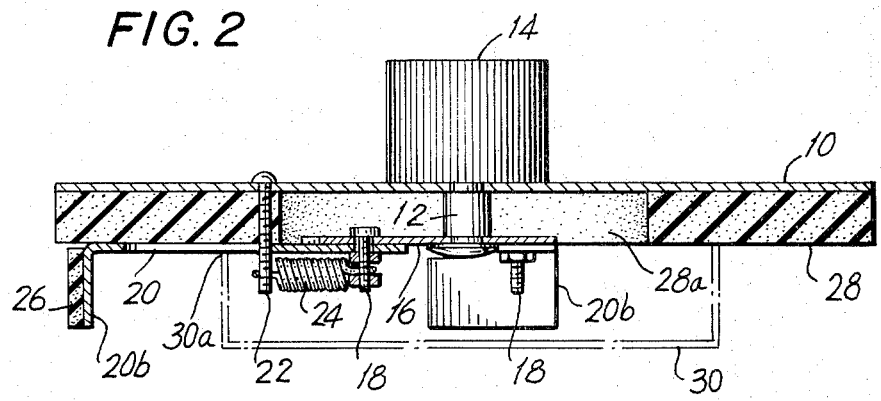
FIG. 2 is a sectional view taken along line II—II in FIG. 1 and shows the parts when viewed from a sectional end view.

Referring to the drawing, a circular disc 10 has a central opening through which a shaft 12 passes. The opening in the disc 10 serves as a bearing support for the shaft. Mounted on one end of the shaft 12, is a rotatable knob 14 which enables the user to readily rotate the shaft.

Attached to the other end of the shaft 12, is a plate or cam member 16 having a triangular shape. The cam 16 is fixed to the shaft 12 so that it is rotatable with the shaft.

Each of the three vertices of the triangular-shaped cam 16, has a pivot 18 to which an arm 20 is linked. Thus, the arm 20 is freely pivotable about the respective vertex or corner of the triangle. Each arm 20, furthermore, has a slot 20a through which a pin 22 extends. The pin 22 is secured or fixed to the circular disc 10. The free end of the arm 20 has an angled portion 20b. The pin 22 serves as a guide pin or post for the slot 20a, for restricting the freedom of motion of the arm 20. The cam 16 is in the form of an equilateral triangle. Through such shape of the cam 16, each of the pivots 18 is equidistant from the center of the disc 10 or the center of the shaft 12.

In operation of the device, in accordance with the present invention, the user rotates the knob 14 and thereby the plate cam 16. With the rotation of the cam 16 to the phantom position shown in FIG. 1, the arms 20 are moved inward and away from the outer diameter of the disc 10. Thus, as a result of the pivot 18 at the corner of the triangle, the arm 20 is drawn inward and away from the outer circumference or surface of the disc 10. Since each pivot 18 is, furthermore, equally spaced from the center of the shaft 12, all of the arms 20 are moved by the same amount away from the outer diameter of the disc 10.

The user rotates the knob 14 until the arms 20 are drawn inward and the angled portions 20b are well within the diameter of the opening to be covered. The rotation of the shaft 12 and hence cam 16 is performed by the user against the resistance of a spring 24. The latter is a tension spring having one end coiled about one guide pin 22, and the other end fixed to the pivot 18 associated with the respective guide pin. This spring 24 serves to return the plate cam 16, and hence the arms 20 to their initial position upon release of the knob 14. In this initial position of the cam 16 and arms 20, these arms 20 are extended to their most outward positions, in which they are closest to the outer diameter of the disc 10. Accordingly, the spring 24 is tensioned or stressed most when the arms 20 are drawn inward to their other extreme position shown in phantom in FIG. 1.

After the user has turned the knob 14 and drawn inward the arms 20 as described above, the disc 10 is applied against the end of the opening to be covered, and the knob 14 is then released. As a result, the spring 24 urges the return of the cam 16 and hence the arms 20 to their initial positions in which the arms 20 are extended. This urging of the arms 20 to their extended or outward position, forces the angled portions 20b of the arms to come into contact with the interior wall or surface of the opening to be covered. Thus, the spring 24 forces the arms 20 to press against the internal rim surface of the opening, to be covered, with the angled portions 20b.

One of the features of the present invention is that the opening is covered through a device which engages the interior wall or surface of the opening. The device, in accordance with the present invention, is independent of the outer shape or construction of the member containing the opening to be covered. Thus, the device, in accordance with the present invention, is adaptable to covering the openings within a pipe, for example, regardless of the thickness of the pipe, or the external shape or design or construction of the outer surface of the pipe. At the same time, the device of the present invention is adaptable to any of the numerous possible interior diameters of the pipe. Furthermore, a circular opening is geometrically determined through three points in a plane. For this reason, three arms 20 are sufficient to locate the device of the present invention in place over the opening. The use of only two arms would be inadequate, and more than three arms is superfluous.

For the purpose of protecting the internal surface of the opening against abrasion from the angled portions 20b as the latter press against the interior surface of the opening, pads 26 are fixed to each of the angled portions. These pads 26 may be made of, for example, foam rubber or other soft and flexible material which will apply the required pressure against the internal surface of the opening, without scratching or otherwise abrading the internal surface of the opening. The disc 10, furthermore, may have attached to it cushioning material in the form of foam rubber, for example, 28 for protecting, in a similar manner, the end or rim of the member containing the opening to be covered. In applying the device to a telescope in accordance with the present invention, for example, the foam rubber 28 is brought into contact with the outer sleeve or tube containing the front or objective lens. The foam rubber 28 thereby serves to protect the end of the sleeve against wear or abrasion that may result when the metallic disc 10 comes into contact with the end of the sleeve. The foam rubber 28 has a central cutout 28a whereby the cam 16 and arms 20 may move freely without interfering with the foam rubber 28. This foam rubber 28 has, thereby, an annular shape.

The movable triangular cam 16 together with the pivots 18 and spring 24, may be covered in the use of the device, through a cover 30. This cover 30 may be simply attached through a screw threaded into a central opening of the shaft 12 at the end carrying the triangular cam 16. The cover 30 has cutouts 30a which allow the arms 20 to move freely with respect to the cover. The cover 30 serves to protect the movable parts of the device.

The arrangement, in accordance with the present invention is not limited to the use of covering lenses in optical devices such as telescopes or reflectoscopes. The device may be used for covering openings in any member, regardless of the outer construction of the member containing the opening.

It will be understood that each of the elements described above, or two or more together, may also find a useful application in other types of opening cover devices differing from the types described above.

While the invention has been illustrated and described as embodied in opening cover devices, it is not intended to be limited to the details shown, since various modifications and structural changes may be made without departing in any way from the spirit of the present invention.

I claim:

1. An arrangement for covering an opening, comprising, in combination, a disc-shaped supporting member for covering said opening; a shaft rotatably held by said disc-shaped supporting member; a plurality of elongated slotted arms having one end linked to said shaft, the rotation of said shaft moving said arms to-and-from the periphery of said disc-shaped supporting member, said arms bearing against the internal surface of said opening when said disc-shaped member is in place for covering said opening; a triangular-shaped plate member mounted on said shaft and linked with said arms at the vertices of said triangular-shaped member; guide pin means projecting through the slots of said slotted arms for guiding the motion of said arms; and spring means attached to said guide pin means and said triangular-shaped member for urging said arms against the internal surface of said opening when said shaft is free of an externally applied force, said arms being drawn toward the interior of said opening and away from said internal surface when said shaft is rotated against the action of said spring means by an externally applied force, the release of said force returning said arm automatically against said internal surface of said opening by the action of said spring means.

2. The arrangement as defined in claim 1 wherein said spring means comprises a tension spring having one end attached to said guide pin means and the other end attached to said triangular-shaped member.

3. The arrangement as defined in claim 1 including manually operable knob means fixed to one end of said shaft for manually rotating said shaft.

4. The arrangement as defined in claim 1 including flexible pad means at the ends of said elongated members bearing against said internal surface of said opening, said flexible pad means protecting said internal surface against direct contact by said elongated elements.

5. The arrangement as defined in claim 1 including flexible pad means on said disc-shaped member and interposed between the end of said opening to be covered and said disc-shaped member when said disc-shaped member is in place for covering said opening.

6. The arrangement as defined in claim 1 including a cover member surrounding said shaft and covering portions of said elongated elements, the remaining portions of said elongated elements projecting from said cover member.

* * * * *